United States Patent
Burr et al.

(10) Patent No.: US 11,259,548 B2
(45) Date of Patent: *Mar. 1, 2022

(54) METHODS OF FEEDING HIGH FAT POURED FEED BLOCKS

(71) Applicant: PURINA ANIMAL NUTRITION LLC, Arden Hills, MN (US)

(72) Inventors: Michael S. Burr, Marthasville, MO (US); J. Christopher Forcherio, Pacific, MO (US); Ronald R. Scott, St. Charles, MO (US)

(73) Assignee: Purina Animal Nutrition LLC, Arden Hills, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/855,409

(22) Filed: Apr. 22, 2020

(65) Prior Publication Data

US 2020/0245644 A1 Aug. 6, 2020

Related U.S. Application Data

(63) Continuation of application No. 14/794,589, filed on Jul. 8, 2015, now Pat. No. 10,667,545, which is a
(Continued)

(51) Int. Cl.
*A23K 10/40* (2016.01)
*A23K 20/158* (2016.01)
(Continued)

(52) U.S. Cl.
CPC .............. *A23K 20/24* (2016.05); *A23K 10/26* (2016.05); *A23K 10/33* (2016.05); *A23K 10/38* (2016.05);
(Continued)

(58) Field of Classification Search
CPC ........ A23K 40/20; A23K 50/10; A23K 40/25; A23K 50/15; A23K 10/40; A23K 20/158
See application file for complete search history.

(56) References Cited

U.S. PATENT DOCUMENTS

| | | | |
|---|---|---|---|
| 3,956,482 | A | 5/1976 | Hahn et al. |
| 4,005,192 | A | 1/1977 | Graham et al. |

(Continued)

FOREIGN PATENT DOCUMENTS

| | | |
|---|---|---|
| KR | 2009-0121758 | 11/2009 |
| WO | 1991007882 | 6/1991 |

OTHER PUBLICATIONS

RangeLand 30-13 Tub, available at: https://www.producerscooperative.com/wp-content/uploads/products/5676%20feed%20tag.pdf; accessed on Jun. 18, 2021; published on Apr. 2004. (Year: 2004).*

(Continued)

*Primary Examiner* — Walter A Moore
(74) *Attorney, Agent, or Firm* — Dorsey & Whitney LLP

(57) ABSTRACT

Methods of feeding ruminants involve positioning the feed blocks in a pasture accessible to the ruminants. The feed block may have a total fat content of about 7 wt % to 33 wt % and an intake modifier to control intake of the feed blocks. High fat pellets having a high total fat content provide at least a portion of the fat in the high fat feed blocks. The methods control a rate of ingestion of high fat feed blocks by ruminants while not negatively affecting performance, and in some instances, ingestion of the blocks results in improved performance.

20 Claims, 3 Drawing Sheets

Related U.S. Application Data continuation-in-part of application No. 14/278,968, filed on May 15, 2014, now Pat. No. 9,936,720.

(51) Int. Cl.
| | |
|---|---|
| *A23K 50/10* | (2016.01) |
| *A23K 20/24* | (2016.01) |
| *A23K 40/25* | (2016.01) |
| *A23K 40/20* | (2016.01) |
| *A23K 10/38* | (2016.01) |
| *A23K 20/10* | (2016.01) |
| *A23K 10/26* | (2016.01) |
| *A23K 10/33* | (2016.01) |

(52) U.S. Cl.
CPC .............. *A23K 10/40* (2016.05); *A23K 20/10* (2016.05); *A23K 20/158* (2016.05); *A23K 40/20* (2016.05); *A23K 40/25* (2016.05); *A23K 50/10* (2016.05); *Y02P 60/87* (2015.11)

(56) References Cited

U.S. PATENT DOCUMENTS

| | | | |
|---|---|---|---|
| 4,016,296 A * | 4/1977 | DeSantis | A23K 20/28 426/69 |
| 4,160,041 A | 7/1979 | Schroeder et al. | |
| 4,171,386 A | 10/1979 | Dickerson et al. | |
| 4,182,755 A | 1/1980 | Mcneff | |
| 4,333,956 A | 6/1982 | Juengst et al. | |
| RE31,763 E | 12/1984 | Skoch | |
| 4,631,192 A | 12/1986 | Mommer et al. | |
| 4,957,769 A | 9/1990 | Theuninck et al. | |
| 5,073,388 A | 12/1991 | Miller | |
| 5,160,753 A | 11/1992 | Van Benthem et al. | |
| 5,169,656 A | 12/1992 | Williams et al. | |
| 5,378,477 A | 1/1995 | Williams et al. | |
| 5,686,125 A | 11/1997 | Mueller | |
| 8,287,268 B1 | 10/2012 | Thomas | |
| 9,936,720 B2 | 4/2018 | Burr et al. | |
| 10,588,333 B2 * | 3/2020 | Burr | A23K 10/33 |
| 10,667,545 B2 * | 6/2020 | Burr | A23K 40/20 |
| 2003/0104112 A1 | 6/2003 | Bachmeier | |
| 2003/0118690 A1 | 6/2003 | Bartle et al. | |
| 2006/0025951 A1 | 2/2006 | Noel | |
| 2006/0045957 A1 | 3/2006 | Bevans et al. | |
| 2006/0182827 A1 | 8/2006 | Drouillard | |
| 2008/0026101 A1 | 1/2008 | Nickel et al. | |
| 2008/0089998 A1 | 4/2008 | Chou | |
| 2010/0330251 A1 | 12/2010 | Weakley et al. | |
| 2011/0229599 A1 | 9/2011 | Scott et al. | |
| 2011/0250316 A1 | 10/2011 | Scheide-fischer et al. | |
| 2012/0114829 A1 | 5/2012 | Freemantle | |
| 2012/0301598 A1 | 11/2012 | Karges et al. | |
| 2013/0129879 A1 | 5/2013 | White et al. | |
| 2015/0327578 A1 | 11/2015 | Burr et al. | |
| 2020/0154735 A1 * | 5/2020 | Burr | A23K 20/24 |

OTHER PUBLICATIONS

Ranch-O-Lyx 22% An Hi Fat Conditioning Tub W/Availa Ranch-Way Feeds; (year: 2015), available at: https://web.archive.org/web/20150310222246/http://www.ranch-way.com:80/products/beef-feed/ranch-o-lyx-hi-fat-hi-energy-tub, Mar. 10, 2015.

"Block Product Description", Cattle Feed-Purina Mills, Purina Animal Nutrition LLC, downloaded from http://purinamills.com/cattle/products/accuration-block/ on Jun. 11, 2015.

Blezinger, Steve B., "Cattle Today: Creep Feeding—Taking Another Look", Online www.cattletoday.com/achive/2000/July/Cattle_Today97.shtml, Aug. 1, 2000, pp. 1-6.

Jensen, Jerry E., "Restricting intake of energy supplements fed to yearling steers grazing irrigated pasture", A Thesis Presented to the Faculty of The Graduate College in the University of Nebraska In Partial Fulfillment of Requirements For the Degree of Master of Science, Mar. 1979, pp. 1-99.

\* cited by examiner

METHODS OF FEEDING HIGH FAT POURED FEED BLOCKS

CROSS-REFERENCE TO RELATED APPLICATION

This application is a continuation of U.S. patent application Ser. No. 14/794,589, filed on Jul. 8, 2015, issued as U.S. Pat. No. 10,667,545 and entitled "Methods of Feeding High Fat Poured Feed Blocks," which is a continuation-in-part of U.S. patent application Ser. No. 14/278,968 filed on May 15, 2014, issued as U.S. Pat. No. 9,936,720 and entitled "High Fat Poured Feed Block," the contents of which are herein incorporated by reference in their entirety.

TECHNICAL FIELD

The present invention relates to methods of feeding animal feed supplements.

BACKGROUND

Supplemental animal feedstuffs fortified with nutritive supplements have been developed in block form to permit free choice feeding and reduce the labor required for mixing the nutritive supplement with the animals' feed ration. Such nutritive supplement blocks include, for example, salt blocks, mineral blocks, protein blocks and molasses blocks.

Compressed blocks or blocks formed by evaporating substantial amounts of water from a feedstuff mixture are known in the art. For example, Bartle et. al., U.S. 2003/0118690 describe a block having high fat content, wherein the block is pressed into tubs.

Skoch et. al., U.S. Pat. No. 4,171,385 describe molasses-based feed blocks wherein magnesium oxide is employed as an ingredient to form a pourable heated composition that self-hardens after cooling into a solid, weather resistant feed block suitable for ruminant consumption. Such feed blocks have the advantage of ease of manufacture, since pourability is provided and hardening of the block occurs without the need to evaporate water, leading to lower manufacturing costs and lower energy consumption in the finished product compared to blocks where water evaporation is necessary.

High fat content in a pourable self-hardening feed block, including fat content of 7 wt % or more, is desirable for current farm productivity practices and provides higher energy content per weight unit of the feed block. While a pourable feed block having fat content of 7 wt % or more can be formed, several problems arise during both manufacturing and use of such feed blocks. Higher fat content increases the viscosity of the liquid mixture, making the mixture difficult to pour. Further, the high fat content noticeably softens the solidified blocks. Softer blocks allow overconsumption by animals when provided as a free choice feed supplement. Still further, pourable molasses based high fat content blends tend to partially separate during solidification, leading to a surface layer of solidified fat or oily residue on the solidified block.

SUMMARY

Disclosed herein is a method of forming a high fat feed block, the method including blending a pourable composition having a viscosity of at least 1000 cP at 57° C. (135° F.), the composition comprising a sugar-containing component, a blendable fat, water, and magnesium oxide; admixing a high fat pellet with the pourable composition to form a pourable admixture, the high fat pellet having total fat content of at least 40 wt % based on pellet weight and comprising at least one high melting point fat, the high melting point fat having a melt temperature of greater than 60° C. (140° F.), wherein the total fat content of the pourable admixture is about 7 wt % to 33 wt %; pouring the pourable admixture into a container; and allowing the pourable admixture to harden into a feed block. In some embodiments, the pourable composition is heated, or exotherms, or both to produce a pourable composition temperature of at least about 50° C. (122° F.); in some such embodiments, the pourable composition temperature is below the melt temperature of the high melting point fat. In some such embodiments, the pourable composition temperature is between about 50° C. and 60° C. (122° F. and 140° F.) and the melting point of the high melting point fat is about 60° C. to 75° C. (140° F. to 167° F.). In some embodiments, the blending further includes adding one or more nitrogen sources. In some embodiments, the blending further includes adjusting the viscosity to between about 1000 cP and 6500 cP at 57° C. (135° F.); in some such embodiments the adjusting is accomplished by adding between 1 wt % and 15 wt % water to the pourable composition based on the weight of the pourable admixture. In some embodiments, the hardening is allowed by maintaining the pourable admixture at about 40° C. to 60° C. (104° F. to 140° F.) for about 1 to 48 hours. In some embodiments, the blending includes blending between 1 wt % and 6 wt % of a blendable fat based on the weight of the admixture and the admixing includes admixing about 5 wt % to 20 wt % high fat pellets based on the weight of the admixture.

Also disclosed herein is a hardened feed block obtained by the method of blending a pourable composition having a viscosity of at least 1000 cP at 57° C. (135° F.), the composition comprising a sugar-containing component, a blendable fat, water, and magnesium oxide; admixing a high fat pellet with the pourable composition to form a pourable admixture, the high fat pellet having total fat content of at least 40 wt % based on pellet weight and comprising at least one high melting point fat, the high melting point fat having a melt temperature of greater than 60° C. (140° F.), wherein the total fat content of the pourable admixture is about 7 wt % to 33 wt %; pouring the pourable admixture into a container; and allowing the pourable admixture to harden into a feed block. In some embodiments, the high fat pellets are substantially uniformly distributed throughout the feed block.

Also disclosed herein is pourable admixture including a pourable composition admixed with high fat pellets, the high fat pellets including a high melting point fat having a melting point above about 60° C. (140° F.) and at least 40 wt % total fat content based on the weight of the pellet, the pourable composition including a sugar-containing component, about 1 wt % to 6 wt % of a blendable fat based on the weight of the pourable admixture, water, and magnesium oxide, wherein the pourable composition has a viscosity of about 1000 cP to 6500 cP at 57° C. (135° F.), and the pourable admixture includes about 7 wt % to 33 wt % total fat content. In some embodiments, the high fat pellets include 45 wt % to 55 wt % total fat content based on the weight of the pellet. In some embodiments, the high fat pellets further include a low melting point fat, the low melting point fat having a melting point below 60° C. (140° F.), wherein the high melting point fat is disposed substantially at the surface of the pellets and encapsulates the pellets. In some embodiments, the admixture includes about 9 wt % to 15 wt % total fat content and about 5 wt % to 20 wt % high fat pellets. In some embodiments, the sugar-containing component includes a molasses. In some embodiments, the admixture further includes a plant based nitrogen source.

Also disclosed herein is a hardened feed block obtained from a pourable admixture, the pourable admixture including a pourable composition admixed with high fat pellets, the high fat pellets including a high melting point fat having a melting point above about 60° C. (140° F.) and at least 40 wt % total fat content based on the weight of the pellet, the pourable composition including a sugar-containing component, about 1 wt % to 6 wt % of a blendable fat based on the weight of the pourable admixture, water, and magnesium oxide, wherein the pourable composition has a viscosity of about 1000 cP to 6500 cP at 57° C. (135° C.), and the pourable admixture includes about 7 wt % to 33 wt % total fat content. In some embodiments, the block is obtained by storing the admixture at about 40° C. to 50° C. (104° F. to 122° F.) for about 1 to 48 hours.

Also disclosed herein is a method of feeding a ruminant that involves positioning a high fat feed block in an area of a pasture accessible to the ruminant. The high fat feed block includes a total fat content of about 7 wt % to 33 wt % with at least a portion of the total fat content provided by high fat pellets and a total chloride content of about 0.65 wt % to about 2.25 wt %. In response to positioning the feed block in the pasture, the ruminant ingests the feed block in an amount sufficient to improve performance.

Additionally disclosed herein is a method of feeding a ruminant involving positioning a high fat feed block in an area of a pasture accessible to the ruminant, where the high fat feed block includes a total fat content of about 7 wt % to 33 wt % with at least a portion of the total fat content provided by high fat pellets and an intake modifier. The high fat pellets may be present in the feed block at about 5 wt % to about 20 wt % of the feed block, and in response to positioning the feed block in the pasture, the ruminant ingests the feed block in an amount sufficient to improve performance.

In certain implementations and alternatives, the high fat pellet has a total fat content of at least 40 wt % based on pellet weight. For instance, the total fat content of the high fat pellet is 45 wt % to 55 wt % based on pellet weight. In some cases, the high fat pellet includes a high melting point fat with a melt temperature of greater than 60° C. (140° F.), and the high melting point fat may be disposed substantially at the surface of the pellets and encapsulates the pellets. Such high fat pellets may be present in the feed block at about 5 wt % to about 20 wt % of the feed block.

In certain implementations and alternatives, the improved performance of the ruminant may be improved body condition score. The feed block may include a sugar-containing component as a primary component, which is present in the feed block at a higher percentage than any other component of the feed block. For instance, the sugar-containing component may include molasses. In certain implementations and alternatives, the feed block is a poured block and may contain magnesium.

DETAILED DESCRIPTION

Figure 1:
FIG. 1 is an image of a pourable high fat feed block.

Although the present disclosure provides references to preferred embodiments, persons skilled in the art will recognize that changes may be made in form and detail without departing from the spirit and scope of the invention. Various embodiments will be described in detail with reference to the drawings. Reference to various embodiments does not limit the scope of the claims attached hereto. Additionally, any examples set forth in this specification are not intended to be limiting and merely set forth some of the many possible embodiments for the appended claims.

Disclosed herein is a method of making a pourable self-hardening feed block having fat content of at least 7 wt % and up to about 33 wt % based on the total weight of the block. The method includes incorporating high fat feed pellets into a pourable composition to form a pourable admixture. The pellets form an admixture with the pourable compositions: that is, the pellets remain substantially discrete within the mixture such that the pellet components do not blend with the pourable composition components, even at temperatures up to or in excess of 60° C. (140° F.).

Since the pellets retain their individual pellet form within the pourable composition, the gross properties of the pourable composition remain largely unaffected by the presence of the pellets: thus, the admixture is easy to pour and hardens in the same manner as a similar composition without the high fat pellets. The high fat pellets include at least about 40 wt % fat based on pellet weight, thereby imparting fat content in excess of 7 wt % and as high as 33 wt % into the admixtures with ease. The pourable admixture has a viscosity suitable for maintaining substantially uniform distribution of the pellets during hardening. The high fat feed blocks are suitable as free choice feed supplements for consumption by ruminant or non-ruminant animals. The hardened blocks have good palatability for animals such as ruminants, including cattle.

The high fat feed blocks further provide a suitable medium or carrier for a variety of additional feed supplement materials. In some embodiments, the feed blocks serve as a medium or carrier for medicaments.

Definitions

As used herein, the term "pourable composition" means a blend including at least a sugar-containing component and a hardening agent. The hardening agent includes magnesium oxide, calcium oxide, calcium hydroxide, ionic salts of magnesium or calcium, or mixtures of two or more thereof. The blend has a viscosity suitable for pouring.

As used herein, the term "blend" means a mixture of two or more components wherein the components are present as a substantially homogeneous mixture, or do not substantially separate in the absence of external force. The blend can be a solution, a dispersion, or a suspension. The components of a blend affect the gross properties thereof, including viscosity.

As used herein, the term "high fat pellet" means a pellet containing at least 40% by weight fat content, wherein the pellet maintains a discrete form and does not flow or blend with the components of the pourable composition at a temperature at or below about 60° C. (140° F.).

As used herein, the term "admixture" means a mixture of two or more components wherein at least one component forms or is present in the mixture as a substantially separate phase, or substantially retains its individual and discrete properties. An admixed component does not contribute to the gross properties of the composition into which the component is mixed, such as viscosity.

As used herein, the term "pourable admixture" means a pourable composition containing high fat feed pellets, wherein the high fat feed pellets are present as an admixture in the pourable composition.

As used herein, the term "feed block" or "pourable feed block" means a water-based sugar-containing composition hardened as a result of an exothermic reaction of a hardening agent with one or more components of the composition.

As used herein, the term "high fat feed block" means a feed block having a total fat content of about 7 wt % to 33 wt %, wherein at least a portion of the total fat content is provided by high fat pellets.

As used herein, the term "about" modifying, for example, the quantity of an ingredient in a composition, concentration, volume, viscosity, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities.

As used herein, the word "substantially" modifying, for example, the type or quantity of an ingredient in a composition, a property, a measurable quantity, a method, a position, a value, or a range, employed in describing the embodiments of the disclosure, refers to a variation that does not affect the overall recited composition, property, quantity, method, position, value, or range thereof in a manner that negates an intended composition, property, quantity, method, position, value, or range. Intended properties include, solely by way of non-limiting examples thereof, viscosity, amount, or volume; intended positions include uniformity of distribution. Where modified by the term "substantially" the claims appended hereto include equivalents to these compositions, methods, and positions.

Compositions

The pourable compositions are prepared by forming a liquid premix that in some embodiments, is a solution, dispersion, or suspension, then adding a hardening agent and optional dry ingredients. The pourable composition is then admixed with high fat feed pellets to form a pourable admixture. The pourable admixture is poured into a container and is allowed to harden to result in a high fat feed block. In this section, components of the pourable composition are described, wherein amounts of the components are generally expressed as weight percentages of the pourable admixture unless otherwise indicated.

The pourable compositions contain at least one sugar-containing component. In embodiments, the sugar-containing component is molasses. The molasses can be any of the sugar-containing molasses such as those obtained as the byproducts of the processing of sugar beets, sugar cane, corn or wood. Examples of suitable molasses include blackstrap molasses, converted molasses, wood sugar molasses, hydrol syrup, citrus molasses and the like. Other suitable sugar-containing components include honey, sugarcane, corn syrup, sugar beet, fruit extracts, and the like. Mixtures of two or more sugar-containing components are suitably blended in the pourable compositions. In some embodiments, one or more C3-C7 sugars, or sugar alcohols, and combinations thereof are suitably included in the sugar-containing component. Examples of suitable sugars include fructose, glucose, galactose, sucrose, maltose, lactose, or two or more thereof. Examples of suitable sugar alcohols include adonitol, allitol, altritol, arabinitol, dulcitol, erythritol, galaxitol, glucitol, glycerol, iditol, inositol, isomalt, lactitol, maltitol, mannitol, perseitol, ribitol, rhamnitol, sorbitol, threitol, and xylitol or two or more thereof.

The sugar-containing component, including any additional sugars or sugar alcohols, is blended in the liquid premix at about 25 wt % to 95 wt % and in the pourable admixture at about 10 wt % to 85 wt % based on the final weight of the pourable admixture, or about 10 wt % to 75 wt %, or about 10 wt % to 65 wt %, or about 10 wt % to 50 wt %, or about 10 wt % to 40 wt %, or about 15 wt % to 75 wt %, or about 20 wt % to 75 wt %, or about 25 wt % to 75 wt %, or about 15 wt % to 50 wt %, or about 20 wt % to 40 wt % based on the final weight of the pourable admixture.

The pourable compositions contain a hardening agent at about 1 wt % to 20 wt % of the pourable admixture, or about 1 wt % to 15 wt %, or about 1 wt % to 10 wt %, or about 1 wt % to 7 wt %, or about 1 wt % to 5 wt %, or about 2 wt % to 10 wt %, or about 3 wt % to 7 wt % of the pourable admixture. In some embodiments, the hardening agent is magnesium oxide, calcium oxide, calcium hydroxide, ionic salts of magnesium or calcium, or a combination thereof. In other embodiments, the hardening agent is magnesium oxide.

In some embodiments, the pourable compositions further contain a blendable fat component. The blendable fat forms a blend, in some embodiments, in the liquid premix, and remains a blend component of the pourable composition. Thus, the blendable fat component, where included, is different from the high fat pellets in one or more of processing history, melting point range, and source of fat. Blendable fats have a melting point range that is about 50° C. (122° F.) or less, for example between about −20° C. and 50° C. (−4° F. and 122° F.), or about −10° C. and 40° C. (14° F. and 104° F.), or about 20° C. and 35° C. (68° F. and 95° F.). The blendable fat includes a substantial amount of a liquid phase at the blending temperature, so that a substantially uniform blend is formed. Suitable blendable fat components include fats, greases, or oils from animal or plant sources. Examples of suitable blendable fat components include yellow grease, choice white grease, vegetable oils such as soybean oil, flaxseed oil, sunflower oil, or cottonseed oil, and including hydrogenated analogs of vegetable oils, nut oils, seed oils, fish oils, beef fat, chicken fat, and the like. Mixtures of two or more blendable fat components are suitably blended in the pourable compositions. The blendable fat is present in the liquid premix at 0 wt % to about 10 wt % and in the pourable compositions at 0 wt % to about 6 wt %, or about 1 wt % to 6 wt %, or about 1 wt % to 5 wt %, or about 2 wt % to 5 wt %, or about 3 wt % to 5 wt %.

In some embodiments, the pourable compositions further contain one or more nitrogen sources. In some embodiments, the nitrogen source is, or includes, protein. In some such embodiments, the nitrogen source is a plant-based nitrogen source. Suitable plant-based nitrogen sources include processed soybeans, soy flakes, dehydrated alfalfa, corn steep liquor, dried distiller's grains, whole cottonseed, cottonseed meal, wheat midds (middlings), soybean meal, corn products, and blends of two or more thereof. In some embodiments, the nitrogen source is animal based. Suitable animal-based nitrogen sources include bone meal, meat meal, fish meal, feather meal, blood meal, and mixtures of two or more thereof. Additional nitrogen sources useful in the pourable compositions include one or more of urea, ammonium sulfate, ammonium polyphosphate, and biuret. Mixtures of two or more nitrogen sources are suitably blended in the pourable compositions. The nitrogen sources are present in the pourable admixture at 0 wt % to about 25 wt %, or about 1 wt % to 20 wt %, or about 5 wt % to 15 wt %.

In some embodiments, the pourable compositions further contain one or more clays. Clays may be useful as water absorbents in the pourable admixtures and may also function as stabilizer or suspension aids to prevent separation of the pourable blend components prior to hardening of the pourable admixture. Examples of suitable clay components include attapulgite clay, bentonite, kaolin and mixtures thereof Mixtures of two or more clays are suitably blended in the pourable compositions. Clay is present in the pourable admixture at 0 wt % to about 5 wt %, or about 0.2 to 5.0 wt %, or about 0.4 to 4.0 wt %, or about 0.5 wt % to 3.0 wt %, or about 0.6 to 2.0 wt %.

In some embodiments, the pourable compositions further contain one or more phosphorus sources. Suitable phosphorus sources include ammonium polyphosphate, dicalcium phosphate, defluorinated bone phosphorus, and tetrasodium pyrophosphate. Mixtures of two or more phosphorus sources are suitably blended in the pourable compositions. Phosphorus sources are present in the pourable admixture at 0 wt % to about 5 wt %, or about 2 wt % to 4 wt %.

In some embodiments, the pourable compositions further contain one or more calcium sources. Suitable calcium sources include calcium chloride, calcium oxide, calcium carbonate, dicalcium phosphate, bone meal, and calcium sulfate. Mixtures of two or more calcium sources are suitably blended in the pourable compositions. Calcium sources are present in the pourable admixture at 0 wt % to about 15 wt %, or about 3 wt % to 10 wt %.

Additional components suitably included in the pourable compositions include sodium chloride, vitamins, trace mineral compounds or elements, fiber sources such as rice hulls, cottonseed hulls, and the like; pH adjusters or buffers, such as sodium hydroxide, calcium carbonate, and the like; and additive flavorings. The amount of such components incorporated into a pourable admixture is determined by the amount needed to reach a neutral pH, or for palatability, or both. Additionally, where desired, one or more antibiotics, or insecticides for animals with ruminant or non-ruminant digestive systems are suitably included in the pourable compositions. The amount of such components incorporated into a pourable admixture is dictated by suitable levels of animal consumption for the intended veterinary purpose.

In embodiments, the high fat pellets are added to the pourable composition after formation of the pourable composition is completed and before pouring, to form the pourable admixture. The amount of high fat pellets added is between about 5 wt % and 50 wt % of the pourable admixture to yield a pourable admixture having a total fat content between about 7 wt % and 33 wt % of the admixture, depending on the fat content of the high fat pellets and the amount of blendable fat in the pourable composition. While more high fat pellets can be added to the pourable admixture without deleterious effect to the pouring and hardening of the feed blocks, it has been found that a total fat content of between 7 wt % and 33 wt % based on the weight of the pourable admixture is desirable for many animal feed purposes to provide a balance of desirable flavor, high energy content, and provision of additional nutrients.

In some embodiments, up to about 6 wt % of the total fat content of the pourable admixture is supplied by the blendable fat component, discussed above, and the balance is supplied by the high fat pellets. In other embodiments, substantially all of the fat content of the pourable admixture is supplied by the high fat pellets. In embodiments, the total fat of the pourable admixture is about 7 wt % to 33 wt % wherein between 1 wt % to 6 wt % of the total fat content is a blendable fat component and the balance of the fat content is provided by the high fat pellets. In an exemplary embodiment, a pourable admixture includes about 4 wt % of blendable fat component and about 10 wt % of a high fat pellet. In various embodiments, the high fat pellets are present in the pourable admixture at about 5 wt % to 20 wt % of the admixture, or about 7 wt % to 15 wt % of the admixture. In various embodiments, the total fat content of the pourable admixtures is about 8 wt % to 20 wt %, or about 9 wt % to 15 wt %.

The high fat pellets generally include at least about 40 wt % total fat based on the weight of the pellets, for example, about 45 wt % to 60 wt % or about 50 wt % to 55 wt % total fat. In some embodiments, the high fat pellets include a high melting point fat, wherein the melting point is at least about 60° C. (140° F.), for example, about 60° C. to 75° C. (140° F. to 167° F.), or about 65° C. to 72° C. (149° F. to 162° F.). In some embodiments, the high fat pellets include two fat sources, a low melting point fat and a high melting point fat, wherein the high melting point fat is disposed substantially at the surface of the pellets and encapsulates the pellets. Such encapsulated pellets are obtained, for example, using the extrusion methods set forth in U.S. Publication No. 2010/0330251, the contents of which are incorporated herein in their entirety for any useful purpose. Where the high fat pellets include both a high melting point fat and a low melting point fat, the ratio of the fat components is generally in the range of about 10:90 to 90:10 high melting fat to low melting fat. The fat sources are selected for melting point suitability, energy content, and palatability for the selected animal. Both animal and plant sources of fat are used in various embodiments, wherein plant fats include hydrogenated analogs thereof. In some embodiments, the high fat pellets include one or more of animal fat, vegetable fat, or hydrogenated vegetable fat.

The remaining material making up the high fat pellets is a carrier material suitable for infusing the fat therein, that are also edible by and palatable to the targeted animal. Suitable carrier materials include grain products and plant protein products. Examples of carrier materials include starches such as corn, wheat, barley, oats, sorghum, tapioca, and the like including isolated dry or wet milled starches, milled components thereof and combinations of two or more thereof. Additional suitable carrier materials for the high fat pellets include various proteins obtained from plant sources. Thus, soybean meal, cottonseed meal, corn gluten meal, and the like are suitable included in the high fat pellets. Examples of useful high fat pellets include supplement feeds sold by Purina Animal Nutrition, LLC of Shoreview, Minn. under the trade name PROPEL®.

In addition or as an alternative to the high fat pellets, a high fat-containing seed having at least about 20 wt % fat, such as ground flaxseed may be used in combination with the pourable compositions. Flax contains omega fatty acids and may provide benefits to the animal. The amount of ground flaxseed added may be between about 5 wt % and 50 wt % of the pourable admixture to yield a pourable admixture having a total fat content between about 7 wt % and 33 wt % of the admixture, depending on the fat content of the ground flaxseed, the amount of high fat pellets and/or and the amount of blendable fat in the pourable composition. Ground flaxseed is between about 40 wt % and 43 wt % total fat based on the weight of the ground flaxseed, and thus provides a source of fat, as well as fiber, which is present at about 27 wt % by weight of the ground flaxseed, and protein, which is present at about 18 wt % by weight of the ground flaxseed. The fat content of ground flaxseed is a mixture of saturated fat at 8 wt %-10 wt % of the total fat, polyunsaturated fat at 68 wt %-73 wt % of the total fat, and monounsaturated fat at 18 wt %-21 wt % of the total fat. In some implementations, pellets may be formed using the ground flaxseed and used as a form of the high fat pellet. In further implementations, such high fat pellets may include a high melting point fat encapsulant. In other implementations, ground flaxseed may be used as a carrier material. In yet further implementations, the ground flaxseed may be provided in its ground form. In addition or alternatively, other high fat-containing seeds such as whole cottonseed having about 20 wt % fat, corn germ having about 20 wt % fat, processed soybeans having about 20 wt % fat, and/or canola having about 43 wt % fat, may be used alone or in combination with the ground flaxseed and/or the high fat pellets as a source of fat.

The pourable compositions, which exotherm upon blending due to the addition of the hardening agent, do not generally reach above about 60° C. (140° F.). Therefore, high fat pellets including either a high melting fat, or a low melting fat encapsulated by a high melting fat, provide a substantially separate phase, or substantially retain their individual and discrete properties within a pourable admixture formed by admixing the pourable composition with the high fat pellets during the exotherm period and prior to hardening of the pourable composition. In this manner, a pourable composition that hardens to form a high fat feed block without further processing is conveniently formed. The high fat feed blocks retain hardness and other properties consistent with poured feed blocks having about 6 wt % or less of blendable fat.

The viscosity of the pourable composition is adjusted to provide for uniform distribution of the high fat pellets in the pourable admixture, while still providing ease of pouring. In embodiments, prior to addition of the high fat pellets, the viscosity of the pourable composition is adjusted to be at least about 1000 cP at 57° C. (135° F.) when measured by Brookfield rheometer (obtained from Brookfield Engineering Laboratories of Middleboro, Mass.) with an RV7 spindle at 10 rpm. In some embodiments, the viscosity of the pourable composition is adjusted to be about 1000 cP to 6500 cP, or about 1500 cP to 5000 cP, or about 2000 cP to 4000 cP. After the high fat pellets are mixed into the pourable composition to form the pourable admixture, the viscosity of the pourable admixture remains substantially the same as the viscosity of the pourable composition. In other embodiments, the hardening agent is highly reactive in the system, or water is rapidly absorbed by the dry ingredients, or both, and the viscosity of the pourable composition or the pourable admixture increases rapidly prior to pouring. In some embodiments, where the high fat pellets are added to the pourable composition after addition of the hardening agent, the viscosity increases substantially between forming the pourable composition and adding the pellets to form the pourable admixture. In such embodiments, the viscosity of the pourable admixture is, for example, about 2000 cP to 6500 cP. Above about 8000 cP, the admixture is no longer pourable. Thus, the initial viscosity of the pourable composition, nominally 1000 cP, is adjusted to account for the increase in viscosity attributable to the rate of reaction of the hardening agent, rate of absorption of water by any such composition components, or both. Optimization is suitably achieved by one of skill in the art of compounding.

The viscosity of the pourable composition and/or the pourable admixture is adjusted either by addition of a viscosifier, where increased viscosity is required, or by controlling the water content of the pourable composition. Suitable viscosifiers include xanthan gum, locust bean gum, agar, carrageenan, alginic acid, sodium alginate, calcium alginate, gum Arabic, gum ghatti, gum tragacanth, karaya gum, guar gum, chicle gum, dammar gum, glucomannan, psyllium seed husks, spruce gum, tara gum, gellan gum, arrowroot, corn starch, β-glucan, various types of cellulose or methyl cellulose, pectin, potato starch, gelatin, chondrin, press cake from *Irvingia gabonensis*, gum karaya, gulaman, montmorillonite clays, bentonite clays, attapulgite clays, and the like.

It will be appreciated that different viscosifiers will be required at different levels, depending on efficacy in the particular combination of components in the pourable composition. The amount of viscosifier employed in the pourable composition is limited only as to the amount required to provide a suitable viscosity as discussed above. In some embodiments, the amount of viscosifier is between about 0.001 wt % to 5 wt % of the pourable admixture, for example about 0.1 wt % to 3 wt % of the pourable admixture.

In some embodiments, the viscosity of the pourable composition, the pourable admixture, or both is adjusted by controlling the amount of free water present in the pourable composition. By "free water" it is meant that water is not substantially adsorbed or absorbed, including chemisorbed, by one or more components of the pourable composition. Absorbed or adsorbed water is not available to contribute to a lower viscosity of the pourable composition or pourable admixture; only free water contributes to decrease the viscosity.

Thus, in some embodiments, the amount of free water is reduced in order to raise the viscosity of the pourable composition or the pourable admixture. In some such embodiments, heavily cross-linked polyacrylate salts, which are superabsorbents, are added to absorb water from the pourable composition in order to adjust viscosity; the absorbed water is no longer free water and no longer contributes to lowering the viscosity of the pourable composition, pourable admixture, or both. Thus the viscosity of the pourable compositions is increased by addition of a superabsorbent. In some embodiments, the amount of free water is reduced by drying the sugar-containing component prior to addition to the pourable composition. In some embodiments, the pourable composition is maintained at an elevated temperature for a period of time to enable water to be driven off; in some such embodiments, convection or vacuum is further applied to increase the rate of evaporation. In some embodiments, a chemical is added to the pourable composition that is known to complex with water. For example, in some embodiments fly ash or similar activated ash compositions, known to include calcium sulfate-based compounds that complex with 10 to 26 moles of water per mole of the compound, are added to the pourable compositions to reduce free water therein.

In other embodiments, it is desirable to lower the viscosity of the pourable compositions. In such embodiments, water is simply added to the pourable composition during formation thereof, or after the addition of the high fat pellets, in an amount that provides a suitable viscosity for maintaining uniform distribution of the high fat pellets but still provides for ease of pouring as described above. In some embodiments, the amount of water added to the pourable composition is between 0 wt % and about 20 wt % of the pourable admixture, for example about 1 wt % to 15 wt %, or about 3 wt % to 15 wt %, or about 5 wt % to 15 wt %, or about 10 wt % of the pourable admixture.

Methods of Making

As is briefly described above, the pourable compositions are prepared by forming a liquid premix that in some embodiments is a suspension or dispersion, then adding a hardening agent and optional dry ingredients to form the pourable composition, wherein the pourable composition is a blend. The pourable composition is then admixed with high fat feed pellets to form a pourable admixture. The pourable admixture is poured into a container and allowed to harden to result in a high fat feed block. The feed block is used as formed, or is divided further, e.g. by cutting. Described herein are the methods used to make the pourable compositions, the pourable admixtures, and the high fat feed blocks. The methods employed to form the pourable compositions are not particularly limited, and it will be appreciated that other methods are envisioned. The methods described below are intended to be representative examples of useful embodiments thereof.

The liquid premix is formed by combining the sugar-containing component and any water soluble or readily water dispersible ingredients employed, optionally with added water; and the optional blendable fat component to finish the premix. The premix is blended with any desired dry ingredients and the hardening agent to form the pourable composition. The pourable composition is a blend. The high fat pellets are added to the pourable composition to form the pourable admixture.

It is an advantage of the methods, compositions, and mixtures disclosed herein that the pourable admixture can be formed in single vessel, preferably equipped with mixing apparatus. In some embodiments, a source of heat is further employed; in some embodiments, additional components for evaporation of water, addition of ingredients, to facilitate pouring, etc. are further included. Suitable heating is applied, for example, by heated water jacket, inductive heating, infrared heating, microwave heating, or any other suitable means to incur substantially uniform heat throughout a mixing operation for the compositions and admixtures mixed and blended herein.

In some embodiments, the mixing apparatus is a paddle mixer, blade mixer, planetary mixer, or double planetary mixer. The mixing apparatus must be sufficient to mix ingredients having a viscosity as high as about 6500 cP. The mixing apparatus is suitable for batch mode or continuous mixing operations, depending on the desire of the operator. For small batches, hand mixing may be sufficient. The shear level of the mixing should be sufficiently low, or adjustable to be sufficiently low in order to avoid shearing and breaking apart of the high fat pellets. The ingredients are added either one at a time, with some mixing between additions, or in embodiments, two or more ingredients are added at one time. Two or more mixing apparatuses are employed in some embodiments, for example, a high shear mixer such as a blender blade type mixer or twin screw extruder to form the pourable composition and a lower shear mixer such as a planetary mixer or kneader to form the pourable admixtures from the pourable compositions.

In some embodiments, any sugar-containing components and a liquid source of nitrogen, such as corn steep liquor, are blended with any added water; then water soluble or readily dispersible ingredients, such as urea, sugars, sugar alcohols, ash, calcium sulfate, calcium carbonate, clay, viscosifiers, water scavengers, medicaments, trace minerals or vitamins, pH adjuster compounds, phosphate compounds, palatants, and the like are added either one by one, followed by blending for a brief period of time such as 10 seconds to 5 minutes, or as a single addition followed by a period of mixing. In some embodiments, it is desirable to add one or more such ingredients with the dry ingredients, as will be determined by one of skill in the art of blending.

In some embodiments, a blendable fat is added to the liquid premix. The blendable fat is dispersible in the liquid premix to form a blend. Up to 6 wt % blendable fat, based on the total weight of the pourable composition, is suitably employed without deleterious effects on pourability, viscosity, separation of fat from the remainder of the components, and block softness.

In some embodiments, the liquid premix mixture is heated, for example to between about 40° C. and 60° C. (104° F. and 140° F.), or about 45° C. to 55° C. (113° F. to 131° F.) during a portion of the mixing or the entirety of the mixing. In some embodiments, a buffer or pH adjuster is added to produce a mixture having a pH of about 5 to 8, or about 6 to 7. When all water soluble or dispersible ingredients and optional added water are blended, the premix is ready to be used to form the pourable composition.

A hardening agent and any desired dry ingredients are then blended with the liquid premix to form the pourable composition. Dry sources of nitrogen or phosphorus, for example, wheat middlings, bone meal, meat meal, cottonseed meal, and the like are suitably blended with the premix if such ingredients are desired. In some embodiments, additional water is added or water is removed or absorbed/adsorbed to adjust viscosity; or viscosifier added during the blending. In some embodiments, the dry ingredients are added one by one, followed by blending for a brief period of time such as 10 seconds to 5 minutes, or as a single addition followed by a period of blending. In some embodiments, where dry ingredients are added, the hardening agent is added in a separate addition before or after the dry ingredients.

In some embodiments, the pourable composition is heated during a portion or the entirety of the blending, for example to between about 40° C. and 70° C. (104° F. and 158° F.), or about 50° C. to 65° C. (122° F. to 149° F.). In other embodiments, the components of the pourable blend are observed to exotherm during blending, wherein the heat generated is sufficient to raise the temperature of the composition to about 40° C. to 60° C. (104° F. to 140° F.), or about 50° C. to 60° C. (122° F. to 140° F.) during blending. Where such an exotherm occurs, generally no heating is necessary to form the pourable blend. After all additions are complete and all ingredients are fully blended, viscosity of the pourable composition is at least about 1000 cP when measured at 57° C. (135° F.) using a Brookfield rheometer (obtained from Brookfield Engineering Laboratories of Middleboro, Mass.) with an RV7 spindle at 10 rpm. In some embodiments, the viscosity of the pourable composition is adjusted to be about 1000 cP to 6500 cP, or about 1500 cP to 5000 cP, or about 2000 cP to 4000 cP at 57° C. when measured by Brookfield rheometer using an RV7 spindle at 10 rpm.

As discussed above, viscosity control of the pourable composition is generally accomplished by adding water, reducing water by absorption, or by addition of one or more viscosifiers. Thus, in embodiments, water is added to the premix, the pourable composition, or both to reach the targeted range of pourable composition viscosity of at least 1000 cP, such as between 1000 cP and 5000 cP at 57° C. (135° F.) as discussed above. In other embodiments, water is removed the premix, the pourable composition, or both by absorption or adsorption to reach the targeted range of pourable composition viscosity of at least 1000 cP at 57° C. (135° F.). In still other embodiments, a viscosifier is added to the premix, the pourable composition, or both in order to reach the targeted range of pourable composition viscosity of at least 1000 cP at 57° C. (135° F.).

Once a completely blended pourable composition having a viscosity of at least 1000 cP at 57° C. (135° F.) is obtained, the high fat pellets are added to the pourable composition, generally in a single addition, and admixed with the pourable composition until substantially uniformly distributed to form the pourable admixture. If desired, the viscosity is remeasured using the same Brookfield measurement as above. In some embodiments, the viscosity of the pourable admixture is substantially the same as the viscosity of the pourable composition, that is, at least 1000 cP. In other embodiments, the viscosity of the pourable admixtures is greater than the viscosity of the pourable compositions, as is discussed above. In such embodiments, the viscosity of the pourable admixtures will be between about 2000 cP and 6500 cP. Viscosity above 8000 cP will be difficult to pour, so optimization of process parameters is required by one of skill.

Once the pourable admixture is formed, it is poured into one or more containers suitable to meet the dimensional requirements of the user; there is no limit on the size of the containers and volume of the pourable admixture that is suitably employed to facilitate the hardening step that occurs after the pouring.

It is an advantage of the methods described herein that the methods are adaptable for batch processes, continuous processes, and semi-continuous processes. The order of addition, mixing time, type and ratio of ingredients, and targeted viscosity at a particular point in the process are adjusted to result in a final pourable admixture that has a viscosity of about 1000 cP to 6500 cP, but at any rate does not exceed 8000 cP at the final stage where the admixture is poured into one or more containers for hardening.

In some embodiments, the poured admixture is held at an elevated temperature for a period of time after pouring, to accelerate the hardening to form the high fat feed block. For example, in some embodiments, the poured admixture is maintained at a temperature between e.g. 40° C. and 60° C. (104° F. and 140° F.), or about 45° C. to 55° C. (113° F. to 131° F.) for about 1 to 48 hours, or about 6 to 36 hours, or about 12 to 24 hours to form a hardened admixture, which is the high fat feed block. In some embodiments, the poured admixture is simply allowed to stand at ambient temperatures to harden and form the feed block. It is a feature of the pourable composition that the interaction of hardening agent with one or more additional components is exothermic, so the temperature will typically remain elevated over ambient temperatures in most manufacturing locations, for a period of time after pouring the admixture. The period of elevated temperature maintenance is followed by cooling to a temperature of between about −20° C. and 40° C. (−4° F. and 104° F.), wherein the exact temperature depends on conditions in the storage area, during use, or both.

Once hardened, the feed blocks are provided as formed for consumption or are further divided by cutting to form suitable size blocks for shipping and/or consumption. Cutting is accomplished using conventional equipment such as saws, slicing machines, or hot knives. While it is not necessary to form a literal block shape, cubic or rectangular shapes are often conveniently formed, in particular where blocks are divided after hardening. Alternatively, a container having virtually any shape used as a receptacle for the poured admixtures will result in a "block" complying with the shape of the interior of the container—thus, cylindrical, frustoconical, or other shapes are easily formed.

Uses

The high fat feed blocks are employed as free choice feed supplements for one or more animals. By "free choice" it is meant that the blocks are placed in an open area accessible at will by an animal. The blocks are sufficiently hard that the animal cannot bite off large sections and cannot lick substantial portions thereof. In some embodiments, the blocks when licked by the animal are targeted to deliver a thin coating on the animal's tongue. In other embodiments, licking does not dissolve the block contents and the animal must nibble, bite, or scrape the block, for example with their tongue and/or teeth. In this way, the blocks are used in free choice feeding to supplement, rather than supplant, the animal's main source of feed.

Additionally, the medicaments or other non-food supplements added to the feed blocks are targeted to deliver a selected level of the supplements to a sick animal or an animal in need of non-food supplements.

The high fat feed blocks are employed in free choice feeding with one or more animals such as ruminants including cattle, sheep, goats, or deer; monogastric animals including pigs, or "pseudoruminants" (hind gut fermenters) such as horses. The animals' nibbling or scraping is sufficient to deliver the increased fat content from the high fat pellets to the animal.

Offering the feed blocks in free choice settings may deliver supplemental nutrients, including fat, to the ruminant. The supplemental nutrients may be particularly helpful to the animal in pasture where the animal ingests high levels of roughage, which is high in fiber but low in fat. However, offering feed blocks in free choice settings can present challenges due to the potential for the animal to uncontrollably or over consume the feed block.

Uncontrolled or over-consumption of the feed block may result in the animal ingesting excessive levels of energy and protein as well as unhealthy amounts of minerals or vitamins typically present in the blocks. In addition, because feed blocks are replaced on a periodic basis, high consumption rates can result in the entire feed block being consumed quickly, for instance, in advance of a scheduled block drop-off, resulting in variable nutrient delivery which can be detrimental to the overall health of the animal. In addition or alternatively, the animals may engage in high consumption of the blocks when new ones are added to the pasture, particularly when the animal has been without a block for a time (e.g., a couple of days) before a new block is introduced.

To control the level of intake of the feed blocks of the present disclosure, calcium chloride, the chloride ion, another intake modifier, or combinations is present in the feed block. Calcium chloride and chloride ions are known intake modifiers used in no roughage feed rations for animals fed in confinement. Implementations of present disclosure instead use chloride ions as an intake modifier in high fat feed blocks placed pasture where cattle freely graze on forage (i.e., a source of roughage) or have free choice access to hay or other forage sources. The intake modifier is effective to control intake of the feed block and may be present in the feed block at surprisingly low levels. Particularly, in contrast to prior approaches in which calcium chloride was present in feed blocks at levels of 4.1 wt % or higher, and in which chloride ion present at about 2.65 wt %; the feed blocks of the present disclosure contain less calcium chloride, such as about 1.0 wt % to 3.5 wt % (e.g., with chloride present at about 0.65 to about 2.26 wt %). Further, the feed blocks of prior approaches contained low levels of fat, such as below 5 wt % as illustrated by the control feed blocks in the Examples of the present disclosure. Moreover, it is surprising that the high fat feed blocks of the present disclosure do not require the same or higher levels of chloride ions compared to a feed block with a lower fat content to control ingestion by the ruminant. Particularly, soft feed blocks result in higher intakes, regardless of fat levels, and high fat blocks are usually softer than low fat blocks. Thus, the softer high fat blocks would be expected to result in more intake. However, it has been discovered that adding fat decreases the palatability of the block. Thus, while the animal should eat a softer block more readily, adding fat decreases intake to some extent. Consequently, it has been discovered that the intake modifier at low levels in combination with the fat facilitates intake control to desired levels. More specifically, it has been discovered that the ruminant does not over-consume high fat feed blocks containing low levels of calcium chloride or chloride ions as illustrated by the Feeding Examples of the present disclosure. The desired consumption levels of the high fat blocks may further be due to a portion of the fat content being imbibed in the high fat pellet, which can cause the block to have a harder consistency compared to blocks having the same fat level but where the fat is freely dispersed in the block, e.g., not imbibed in a pellet. The presence of the intake modifier further does not negatively affect the animal's intake of forage or other sources of roughage. Rather, the high fat feed blocks of the present disclosure provide a source of energy that is in addition to grasses, hay or other forage or feed, which results in the animal experiencing improved performance. Such improved performance may include, but is not limited, to improved body condition score, increased weight gain, increased meat production, improved health, improved milk production, or combinations. In addition to chloride containing components, other intake modifiers may be effective to modify animal intake of the high fat feed blocks while resulting in improved animal performance and include but are not limited to: ammonium sulfate, calcium sulfate, salt, calcium chloride, sodium hydroxide, diammonium phosphate, fish oil, coconut oil, palm kernel oil, meat meal, chlorinated fat and acidulated fats. Such intake modifiers may be present at relatively low levels due to the presence of the fat-imbibed nugget in the high fat feed block. For instance, the intake modifier may be present at 1.0 to 3.5 wt % of the block.

Properties

The properties of the pourable admixtures and the feed blocks formed by hardening the pourable admixtures provide many advantages over conventional feed blocks while avoiding drawbacks observed with previous efforts to make high fat feed blocks.

A first advantage of the high fat feed blocks is that the increased energy levels for animals in free choice feeding compared to conventional feed blocks having about 5 wt % or less total fat content, without concomitant reduction in feed block hardness. Conventionally, the fat content of the feed blocks is limited to a maximum inclusion of about 5 wt % to 6 wt %. When a low-melting point fat—that is, a fat that is a liquid at room temperature or below about 40° C. (104° F.)—is included in the product at a higher level, the finished feed block tends to be sufficiently soft that increased or overconsumption results when fed free choice. The feed blocks are intended for use at a targeted level to supplement but not supplant an animals' main food source; thus, the target hardness is a hardness where the animal can lick, nibble or scrape the feed block but not bite chunks from it. By adding high fat pellets to the pourable admixture, wherein the pellets' melting point is sufficient to withstand at least the temperature reached by the pourable admixture as the exothermic hardening reaction occurs without melting, the pellets remain discrete in the feed block matrix. In this manner, the high fat feed block is obtained without incurring a substantial negative effect on the hardness of the feed block. The licking, nibbling or scraping by the animals is still sufficient to deliver the increased fat content to the animal.

A second advantage of the high fat feed blocks is providing high fat content in a pourable admixture that retains the ease of pouring associated with the pourable compositions. Conventionally, when a low melting point fat is added to a pourable composition in levels over about 5 wt % to 6 wt %, the viscosity of the pourable composition increases to the point where it is difficult to pour into the containers for hardening. The high fat pellets include a high melting point fat that does not become liquid or otherwise flow at temperatures at or below about 60° C. (140° F.). Thus, during the mixing of the pellets with the pourable composition, the pellets do not blend with the pourable composition, instead forming an admixture with the pellets retaining their discrete and individual identity within the admixture. As a result, the pourable admixtures do not suffer from undue increases in viscosity.

A third advantage of the high fat feed blocks is that the fat does not separate from the remainder of the components of the block. In many embodiments, when a low melting point fat is added to the pourable composition in levels over about 5 wt % to 6 wt %, the low-melting fat separates during the hardening process and results in an oily film on the top surface of the feed blocks. The viscosity of the pourable composition is adjusted to retain the high fat pellets in a uniform distribution within the pourable admixture. The uniformity is maintained after pouring and through the hardening process. Further, since the pellets do not melt during the exotherm caused by the addition of the hardening agent, separation due to melting and liquid phase formation of the fat does not occur. The pellets—thus the fat content overall—remains uniformly distributed throughout the high fat feed blocks.

EXAMPLES

The following examples are exemplary of the invention, where "C" denotes a Control example.

Examples C1, C2, and C3

The ingredients listed in Table 1 were mixed by addition of ingredients to a Waring Blender.

TABLE 1

Premix ingredients used in Examples C1, C2, and C3.

| Ingredient | Premix C1, wt % | Premix C2, wt % | Premix C3, wt % |
| --- | --- | --- | --- |
| Cane molasses | 44.75 | 40.35 | 40.35 |
| Corn steep liquor | 15.27 | 8.27 | 8.27 |
| Water | 9.55 | 12.27 | 12.27 |
| Tetrasodium pyrophosphate | 0.21 | 0.21 | 0.21 |

TABLE 1-continued

Premix ingredients used in Examples C1, C2, and C3.

| Ingredient | Premix C1, wt % | Premix C2, wt % | Premix C3, wt % |
| --- | --- | --- | --- |
| Attapulgite clay | 1.45 | 1.45 | 1.45 |
| Calcium chloride | 0 | 0 | 3.58 |
| Calcium sulfate | 1.45 | 1.45 | 1.45 |
| Yellow grease | 6.12 | 14.80 | 14.80 |
| Calcium carbonate, fine | 2.91 | 2.91 | 2.91 |
| Dicalcium phosphate, precipitated | 4.78 | 4.78 | 4.78 |
| Urea | 8.33 | 8.33 | 8.33 |
| Vitamin and trace mineral mix | 0.33 | 0.33 | 0.33 |
| Sodium hydroxide | 3.58 | 3.58 | 0 |
| TOTAL | 100.00 | 100.00 | 100.00 |

The premixes were not subjected to any viscosity measurements but generally were observed to have very similar or the same viscosity. Then each of the premixes of Table 1 were in turn transferred to a 5-quart KitchenAid planetary mixer, and mixed with additional ingredients listed in Table 2 to form final mixtures.

TABLE 2

Ingredients of final mixtures of Examples C1, C2, and C3.

| Ingredient | Ex. C1, wt % | Ex. C2, wt % | Ex. C3, wt % |
| --- | --- | --- | --- |
| Premix C1 | 68.83 | 0 | 0 |
| Premix C2 | 0 | 68.83 | 0 |
| Premix C3 | 0 | 0 | 68.83 |
| Cracked corn | 5.00 | 5.00 | 5.00 |
| Dried distillers grains solubles | 10.00 | 10.00 | 10.00 |
| Wheat middlings | 5.00 | 5.00 | 5.00 |
| Cottonseed meal | 0.10 | 0.10 | 0.10 |
| Feather meal | 1.57 | 1.57 | 1.57 |
| Water | 5.00 | 5.00 | 5.00 |
| Magnesium oxide | 4.50 | 4.50 | 4.50 |
| TOTAL | 100.00 | 100.00 | 100.00 |

The final mixture of C1 was poured into a 16 oz. cup. The viscosity of Examples C2 and C3 were so high they could not be poured; rather, they had to be scraped out of the mixer and scooped into the cups. The cups were covered with lids and placed in an oven set of 49° C. (120° F.) overnight. Upon removing the cups and allowing them to cool to ambient temperature (20° C.-23° C., or 68° F.-73° F.), the hardness was tested for each finished mixtures using a fruit firmness tester equipped with a 7/16" probe. The mixture of C1 was 23, C2 was 17, and C3 was 23. Thus, the addition of calcium chloride appeared to remedy the softness of the high fat mixture, but did not help provide a pourable mixture.

Examples 1 and 2

The ingredients listed in Table 3 were mixed in a Myers mixer (obtained from Myers Engineering, Inc. of Bell, Calif.) to form a liquid premix. The mixer was heated using a steam jacket wherein water jacket temperature was set to 60° C. (140° F.).

TABLE 3

Premix ingredients used in Examples 1 and 2.

| Ingredient | Weight % |
| --- | --- |
| Cane molasses | 42.53 |
| Corn steep liquor | 15.20 |
| Water | 9.50 |
| Tetrasodium pyrophosphate | 0.20 |
| Attapulgite clay | 1.40 |
| Calcium chloride | 6.10 |
| Calcium sulfate | 1.40 |
| Choice white grease | 6.10 |
| Calcium carbonate, fine | 2.90 |
| Dicalcium phosphate, precipitated | 4.77 |
| Urea | 8.30 |
| Vitamin and trace mineral mix | 0.30 |
| 50% Sodium hydroxide in water | 1.30 |
| TOTAL | 100.00 |

The premix was partitioned for further mixing with additional ingredients as listed in Table 4. The ingredients were mixed as indicated to form two pourable admixtures. PROPEL® nuggets (high fat pellets). Then the PROPEL® pellets were mixed in and the viscosity was remeasured just prior to pouring.

TABLE 4.

Ingredients blended to form the pourable admixtures of Ex. 1 and 2.

| Ingredient | Ex. 1, wt % | Ex. 2, wt % |
| --- | --- | --- |
| Premix from Table 3 | 68.80 | 68.80 |
| Water | 4.00 | 3.50 |
| Magnesium oxide | 4.50 | 4.50 |
| Wheat middlings | 6.10 | 6.60 |
| Cottonseed meal | 5.00 | 5.00 |
| Feather meal | 1.60 | 1.60 |
| PROPEL ® Energy Nuggets (obtained from Purina Animal Nutrition, LLC of Shoreview, MN) | 10.00 | 10.00 |
| TOTAL | 100.00 | 100.00 |

Viscosities were measured using Brookfield rheometer (obtained from Brookfield Engineering Laboratories of Middleboro, Mass.) with an RV7 spindle at 10 rpm. The mixture of Example 1 had a first viscosity (measured just prior to addition of the nuggets) of 800 cP and a second viscosity (just prior to pouring) of 4800 cP. The mixture of Example 2 had a first viscosity (measured just prior to addition of the nuggets) of 2400 cP and a second viscosity (just prior to pouring) of 5600 cP.

The two mixtures were easily poured into 102 liter (27 gallon) containers and placed in a room maintained at 49° C. (120° F.) for 24 hours. Then the mixtures were removed from the heated room and allowed to cool at ambient temperature (about 20° C.-23° C., or 68° F.-73° F.) for several days. The resulting mixtures were hardened to a good quality feed block hardness level. The hardened mixtures were then cut in half using a cable saw. The hardness was tested for each finished blocks of Examples 1 and 2 using a fruit firmness tester equipped with a 7/16" probe. Both blocks had a hardness of 26.

Figure 2:
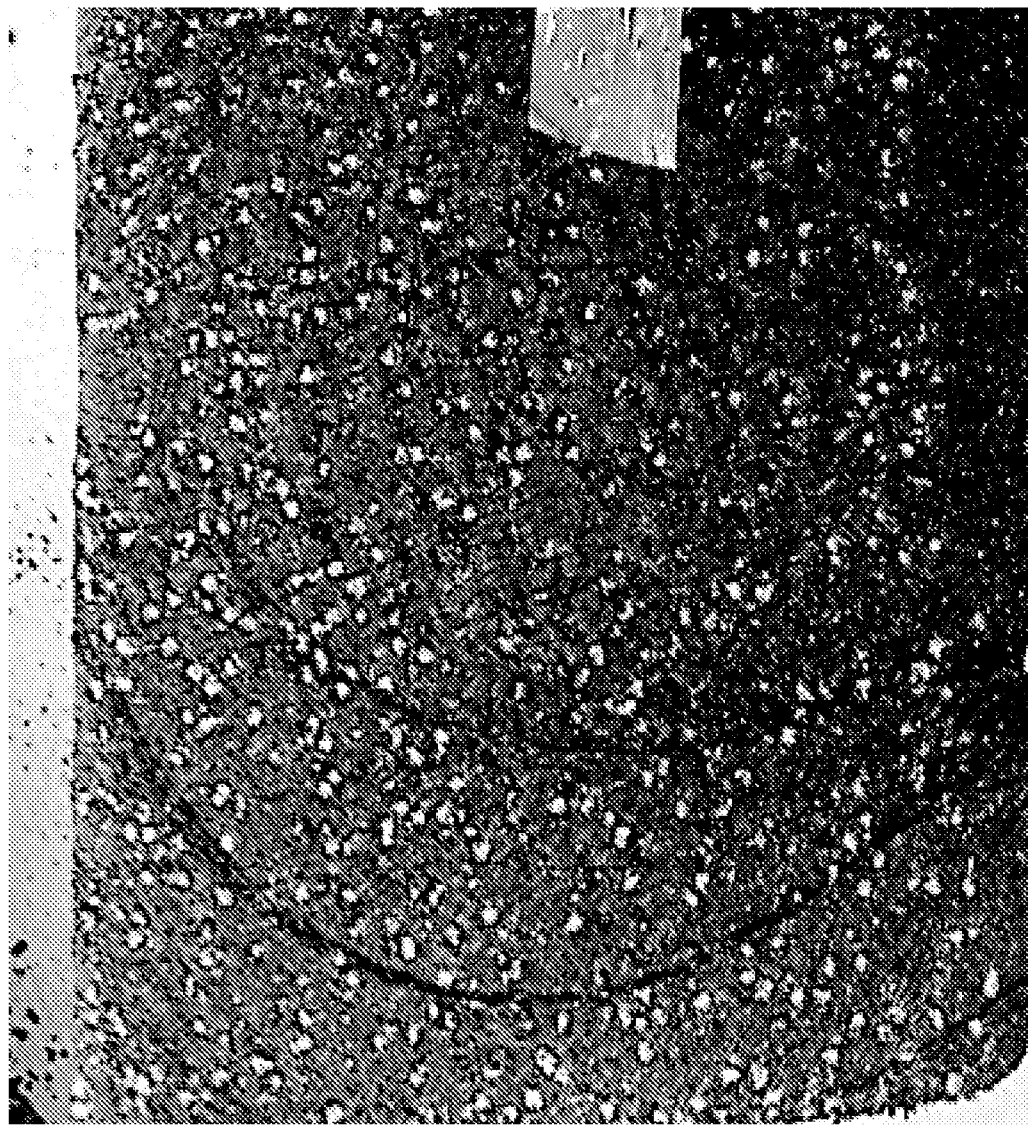
FIG. 2 is an image of another pourable high fat feed block.

FIGS. 1 and 2 show the appearance of the cut hardened mixtures at the saw cut surfaces. FIG. 1 shows the cut surface of the hardened mixture of Example 1. FIG. 2 shows the cut surface of the hardened mixture of Example 2. The light colored areas/specks in the dark mixtures are the PROPEL® pellets. It can be seen that the mixture of FIG. 2 has a substantially uniform distribution of pellets, while the mixture of FIG. 1 is not as uniform and a concentration of the pellets has migrated toward what was the top of the container during hardening.

FEEDING EXAMPLES

The following feeding examples are exemplary in nature and not to be construed as limiting.

Feeding Example 1

Materials and Methods: To study the intake of high fat feed blocks compared to control blocks by grazing cows, 80 crossbred cows in late lactation/gestation were divided into two treatment groups, each treatment group being divided into six pastures with 6-7 cow-calf pairs per pasture. Both control and test blocks were manufactured in the same facility.

TABLE 5

Illustrates the components of the control feed blocks.
Table 5

| Ingredient | Wt % |
| --- | --- |
| Molasses | 26.4 |
| Cracked Corn | 5.0 |
| Dried Distiller's Grains | 10.0 |
| Wheat Middlings | 5.1 |
| Cottonseed Meal | 2.1 |
| Clay | 1.0 |
| Dicalcium Phosphate | 3.1 |
| Salt | 2.5 |
| Urea | 5.9 |
| Yellow Grease | 4.0 |
| Corn Steep Liquor | 10.5 |
| Water | 13.4 |
| Calcium Chloride | 4.2 |
| Calcium Sulfate | 1.0 |
| Magnesium Oxide | 4.5 |
| Sodium Hydroxide | 0.9 |
| Tetra-sodium Pyrophosphate | 0.1 |
| Vitamins and Trace Minerals | 0.3 |
| Total | 100.0 |

The control block contained 5 wt % fat mainly derived from yellow grease (4 wt %). The test block contained 10 wt % fat with 4 wt % from yellow grease and 6 wt % from a high fat nugget where the total weight of the nugget accounted for 10 wt % of the test blocks. Cracked corn and a portion of molasses from the control block formula was replaced by the high fat nugget in the test blocks but otherwise the control and test blocks were formulated similarly and contained about 4.2 wt % calcium chloride. All blocks contained about 25 wt % protein.

One block was always accessible on a free choice basis in pasture over the course of the 9 week trial. When blocks were completely consumed, they were removed from the pasture and a new block was added. Block hardness was measured on each block as they were placed in the pastures using a ⅜" diameter probe attached to the 30 pound fruit tester. Mineral blocks were also placed in pasture and available free choice. Hay was provided if forage became less available. One tub of the respective treatment was placed in each pasture and staked down to prevent tipping during consumption. Weights of each of the blocks tested and the mineral blocks were recorded upon placing in pasture and upon removal. In addition, weights were recorded every week if the block lasted more than 7 days.

Figure 3:
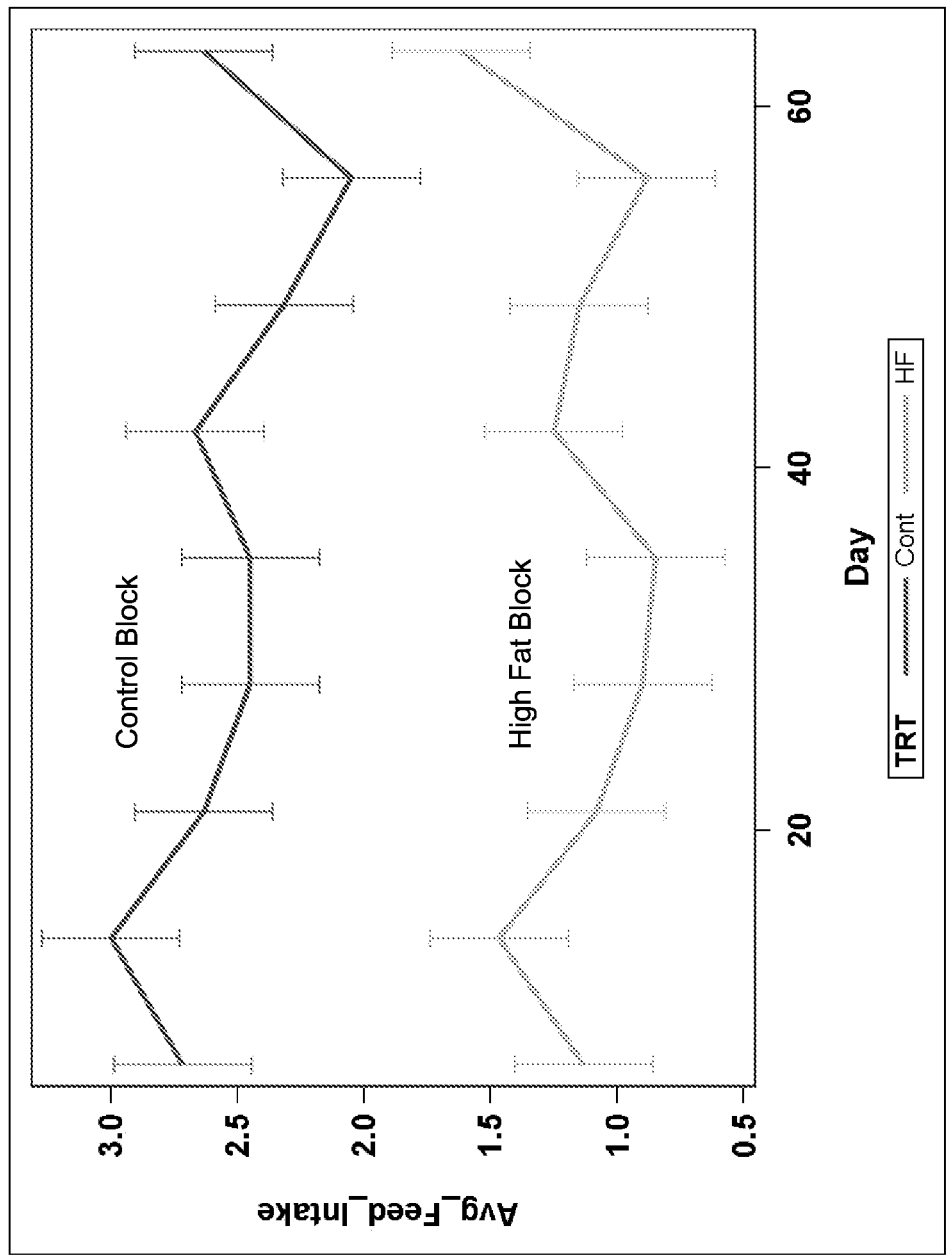
FIG. 3 is a graph illustrating a comparison of average intake by cows in pasture of a high fat feed block compared to a control block having a lower fat content.

Results: The control blocks were generally harder than the test blocks (high 20s to >30 compared to low to mid-20s using the fruit tester). Cows consumed less of the test block compared to the control. On average, cows in pasture with the test block consumed 1.1 lbs. per head per day, while cows in pasture with the control block consumed 2.5 lbs. per head per day. This lower intake occurred during all weeks of the 9 week study as illustrated in FIG. 3. The results of Feeding Example 1 were surprising because it was expected that the softness of a higher fat content feed block would result in more rapid consumption compared to the lower fat control. Further, the intake level of the softer high fat block was depressed to 1.1 lbs. per head per day, which is an undesirable both from the standpoint of an intake level and because intake of the soft block was expected to be closer to that of the control block.

Feeding Example 2

Materials and Methods: Because it is desirable for high fat feed blocks to be consumed at above 1.1 lbs. per head per day, 30 steers in confinement were subjected to another study to determine whether reducing the level of calcium chloride in the high fat feed block would result in increased consumption by the animals. Three block treatments in 60-lb. tubs were manufactured in the same location. The control treatment was a 5 wt % fat block, the first test block contained 10 wt % fat (derived from yellow grease and high fat nuggets) and 4.2 wt % calcium chloride, and the second test block contained 10 wt % fat derived from the same fat sources with 2.1 wt % calcium chloride. Aside from the calcium chloride level in the second test block, the control and test blocks were otherwise formulated substantially the same as those in Feeding Example 1.

The steers were housed in pens that contained individual feeding bunks that are designed to monitor consumption by each animal. The steers were fed grass hay free choice. Each steer was offered one 60 lb. tub for ten days, and each received each of the three blocks studied, resulting in a trial conducted over 30 days. Hardness measurements were taken at the beginning of each ten-day feeding period. For each tub, three measurements were taken and the average recorded.

Results: The block hardness ($P<0.0001$) was different among the three block treatments. The control block was the hardest as expected (~22) and the second test block (2.1% CaCl) block was the softest (~13.6). The first test block (4.2 wt % CaCl) was intermediate (~20) to these but closer in hardness to the control block. Though there were differences in hardness in the block treatments, intakes were similar between the control (3.7 lbs./day) and the first test block (3.8 lbs./day). Intake was the greatest with the second test block (2.1 wt % CaCl) with an average intake of 4.8 lbs./day, but this block was also the softest. The overall increased consumption of the blocks in Feeding Example 2 compared to Feeding Example 1 may be a function of feeding in a small pen vs. offering the blocks in a larger pasture setting. The steers in Example 2 were much smaller than the cows in Example 1 so the steers should have eaten much less but they actually ate more because they were fed in confinement. However, the results of Feeding Example 2 show that reducing the level of calcium chloride in the high fat feed block to below 4.2 wt % resulted in increased consumption by the animal.

Feeding Example 3

Materials and Methods: The trial conducted for Feeding Example 3 was conducted on 16 steers in confinement and the materials and methods in this Example were otherwise substantially the same as that of Feeding Example 2. The same stock of control and test blocks were used.

Results: Block hardness (P<0.0001) was different among the three block treatments. The control block (5% fat) was the hardest as expected (~20.5) and the second test block (2.1 wt % CaCl) was the softest (~13). The first test block (4.2 wt % CaCl) was intermediate (~19) but closer in hardness to the control block. Though there were differences in hardness in the block treatments, intakes tended to be similar for the control and first test blocks and the cattle ingesting the control block averaged 6.63 lbs. per head per day and the cattle ingesting the first test block averaged 6.62 lbs. per head per day. The group ingesting the second test block exhibited an increase in intake an averaged 7.39 lbs. per head per day.

Feeding Example 4

Materials and Methods: The trial of Feeding Example 4 was conducted on grazing cows to determine the effects on intake by reducing the level of calcium chloride in the high fat feed blocks. In this trial, 80 crossbred cows in mid-lactation/early gestation were divided into three treatment groups, each treatment group being divided into four pastures with 6-7 cow-calf pairs per pasture. Both the control and two different test blocks were manufactured in the same facility and were from the same stock as Feeding Examples 2 and 3.

As in Feeding Example 1, one block was always accessible on a free choice basis in pasture over the course of the 15 week trial. When blocks were completely consumed, they were removed from the pasture and a new block was added. Block hardness was measured on each block as they were placed in the pastures. Mineral blocks were also placed in pasture and available free choice. Hay was provided if forage became less available. One tub of the respective treatment was placed in each pasture and staked down to prevent tipping during consumption. Weights of each of the blocks tested and the mineral blocks were recorded upon placing in pasture and upon removal. In addition, weights were recorded every week if the block lasted more than 7 days.

Body condition scores (BCS) were taken at the beginning and at the end of the trial. BCS is a numeric measure ranging from 1 (emaciated) to 9 (extremely obese) based on a trained person's subjective evaluation of fat on an animal. A target score is 6. For this trial, three trained individuals scored each cow independently. The training for BCS scoring involves details of what to look for and what areas of the ruminant's body (typically BCS is assigned to cows, bulls, steers and heifers but generally is associated with breeding stock (cows, bulls, & replacement heifers)) to evaluate (top line, ribs, brisket, hindquarters, tail head area and front quarter). After visually evaluating the fat cover (or condition) at each of these areas, the animal is assigned a BCS. After all three people have scored the cows, the values are averaged for each animal and is the reported BCS. The difference in the ending BCS from the beginning BCS is how much the animal changed condition over the time period. A positive change means the animal has more condition and a negative change means the animal has lost condition.

Results:

Over the 15-week trial, the control blocks were the hardest (22). The second test blocks (2.1 wt % CaCl) were the softest (13) while the first test blocks (4.2 wt % CaCl) were intermediate (19).

Intake was similar among the three block treatment over the 15 weeks. The control and first test block were ingested at a rate of 1.7 and 1.8 lbs. per head per day, respectively. The second test blocks were ingested at a slightly elevated level of 1.9 lbs. per head per day.

The animals consuming the high fat tubs tested improved performance compared to the control group. Body condition score (BCS) was similar among treatments at the beginning, with an average BCS of about 6.1 and at the end the study, with an average BCS of about 6.2. However, there was a numerical trend for the cows that consumed the two test blocks (e.g., with 10 wt % fat and either 2.1 or 4.2 wt % CaCl) to have an increase in BCS over the study than cows ingesting the control blocks.

Consumption of mineral blocks was similar among the treatments at 2-3 oz./head/day. Similar intake was expected since tub intake was similar. Intake trends of the mineral were closely related to intake trends of the tubs. When tub intake was low, mineral intake was higher and vice versa.

Feeding Example 5

Materials and Methods: Feeding Example 5 was similar to Feeding Example 4 with the trial conducted on grazing cows. In this trial, 87 crossbred cows were allocated to two treatment groups, with each treatment group being divided into six pastures with 6-7 cow-calf pairs per pasture. Cows were offered either a control block as in Feeding Examples 2 through 4 or a test block containing 10 wt % fat formulated the same as the test blocks of Examples 2 through 4 with the exception that the calcium chloride level was 3.1 wt % of the block. Otherwise, the materials and methods in this Example were otherwise substantially the same as that of Feeding Examples 1 and 4.

Results: Block hardness differed (P<0.05) among the two block treatments. The control block (5% fat) was the hardest as expected (26) and the test block (3.1 wt % CaCl) was the softest (24), however, compared to previous trials, the difference in softness was not as large. Though there were similarities in hardness in the block treatments, intakes significantly differed (P<0.05) and the group ingesting the control block averaged 3.0 lbs. per head per day and the group ingesting the test block averaged 4.4 lbs. per head per day.

The invention illustratively disclosed herein can be suitably practiced in the absence of any element which is not specifically disclosed herein. While the invention is susceptible to various modifications and alternative forms, specifics thereof have been shown by way of examples, and are described in detail. It should be understood, however, that the invention is not limited to the particular embodiments described. On the contrary, the intention is to cover modifications, equivalents, and alternatives falling within the spirit and scope of the invention. Additionally each and every embodiment of the invention, as described here, is intended to be used either alone or in combination with any other embodiment described herein as well as modifications, equivalents, and alternatives thereof falling within the spirit and scope of the invention.

The various embodiments described above are provided by way of illustration only and should not be construed to limit the claims attached hereto. It will be recognized that various modifications and changes may be made without following the example embodiments and applications illustrated and described herein, and without departing from the true spirit and scope of the claims.

In various embodiments, any of the claimed embodiments suitably comprise, consist essentially of, or consist of the elements described herein and claimed according to the claims.

What is claimed is:

1. A method of feeding an animal, the method comprising:
positioning a high fat feed block in an area accessible to the animal,
wherein the high fat feed block comprises a blendable fat component and high fat pellets that together provide a total fat content of about 7 wt % to about 33 wt % with a majority of the total fat content provided by the high fat pellets,
wherein the high fat pellets constitute discrete components of the high fat feed block, distinct from the blendable fat, and
wherein in response to positioning the high fat feed block in the area accessible to the animal, the animal ingests the high fat feed block in an amount sufficient to improve performance.

2. The method of claim 1, wherein the high fat pellets have a total fat content of at least 40 wt % based on pellet weight.

3. The method of claim 1, wherein the high fat pellets comprise a high melting point fat, the high melting point fat having a melt temperature greater than 60° C. (140° F.).

4. The method of claim 3, wherein the high melting point fat is disposed substantially at the surface of the pellets.

5. The method of claim 1, wherein the high fat pellets are present in the high fat feed block at about 5 wt % to about 20 wt % of the high fat feed block.

6. The method of claim 1, wherein the high fat feed block further comprises a hardening agent selected from the group consisting of: magnesium oxide, calcium oxide, calcium hydroxide, ionic salts of magnesium or calcium, and combinations thereof.

7. The method of claim 1, wherein the high fat feed block further comprises at least one sugar-containing component, the sugar-containing component being present in the high fat feed block at a higher percentage on a dry matter basis than any other component of the high fat feed block.

8. The method of claim 1, wherein the blendable fat has a melt temperature of less than about 50° C. (122° F.).

9. The method of claim 1, wherein the high fat feed block constitutes a supplemental feed to the animal.

10. The method of claim 9, further comprising providing a second source of feed to the animal, the second source of feed constituting a main source of feed to the animal.

11. The method of claim 10, wherein the main source of feed comprises roughage.

12. The method of claim 1, wherein the high fat feed block further comprises an intake modifier formulated to prevent over-consumption of the high fat feed block.

13. The method of claim 12, wherein the intake modifier comprises calcium chloride in an amount ranging from about 1.0 wt % to about 3.5 wt %.

14. The method of claim 12, wherein the intake modifier is selected from the group consisting of: ammonium sulfate, calcium sulfate, salt, calcium chloride, sodium hydroxide, diammonium phosphate, fish oil coconut oil, palm kernel oil, meat meal, chlorinated fat, acidulated fat, and combinations thereof.

15. The method of claim 1, wherein the high fat feed block further comprises a medicament.

16. The method of claim 1, further comprising providing a second high fat feed block after the animal ingests the high fat feed block, the second high fat feed block substantially similar to the high fat feed block.

17. The method of claim 1, further comprising providing a mineral block concurrently with providing the high fat feed block.

18. The method of claim 1, wherein the area accessible to the animal comprises a confined pen.

19. The method of claim 1, wherein the improved performance of the animal is improved body condition score.

20. The method of claim 1, wherein the high fat feed block further comprises at least one nitrogen source selected from the group consisting of: grain products, soybeans, soy flakes, dehydrated alfalfa, corn steep liquor, dried distiller's grains, whole cottonseed, cottonseed meal, wheat middlings, soybean meal, corn products, corn gluten meal, molasses, and blends of two or more thereof.

* * * * *